US012494182B1

(12) United States Patent
Chen

(10) Patent No.: US 12,494,182 B1
(45) Date of Patent: Dec. 9, 2025

(54) DISPLAY DRIVING DEVICE AND IMAGE COMPENSATION METHOD

(71) Applicant: HIMAX TECHNOLOGIES LIMITED, Tainan (TW)

(72) Inventor: Fu Hsing Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 19/023,420

(22) Filed: Jan. 16, 2025

(51) Int. Cl.
*G09G 3/36* (2006.01)
*G09G 5/36* (2006.01)

(52) U.S. Cl.
CPC ......... *G09G 3/3607* (2013.01); *G09G 3/3614* (2013.01); *G09G 5/36* (2013.01)

(58) Field of Classification Search
None
See application file for complete search history.

(56) References Cited

U.S. PATENT DOCUMENTS

2013/0135365 A1* 5/2013 Ito .......................... G09G 3/003 345/690
2016/0343318 A1* 11/2016 Wang .................. G09G 3/3614
2016/0351138 A1* 12/2016 Wang .................. G09G 3/3614

* cited by examiner

*Primary Examiner* — Parul H Gupta
(74) *Attorney, Agent, or Firm* — JCIPRNET

(57) ABSTRACT

A display driving device and an image compensation method are provided. The display driving device includes an accumulation module, a calculation module, and a compensation module. The accumulation module accumulates a first gray level accumulation value of a plurality of positive polarity pixels and a second gray level accumulation value of a plurality of negative polarity pixels. The calculation module calculates a normalized difference value of the first gray level accumulation value and the second gray level accumulation value, and adjusts a first offset value and a second offset value according to a weight value corresponding to the normalized difference value to generate an adjusted first offset value and an adjusted second offset value. The compensation module compensates a plurality of target compensation pixels according to the adjusted first offset value and the adjusted second offset value.

20 Claims, 5 Drawing Sheets

DISPLAY DRIVING DEVICE AND IMAGE COMPENSATION METHOD

BACKGROUND

Technical Field

The disclosure relates to a device, and particularly relates to a display driving device and an image compensation method.

Description of Related Art

In the conventional technology, when a display panel displays some specific images, a huge gray level difference (i.e. data voltage difference) will occur between the positive and negative polarities of some pixels, thus causing crosstalk on a pixel array of the display panel, and resulting in poor display effects.

SUMMARY

The disclosure is directed to a display driving device and an image compensation method, which are adapted to provide a better display effect.

The display driving device includes an accumulation module, a calculation module, and a compensation module. The accumulation module is configured to accumulate a first gray level accumulation value of a plurality of positive polarity pixels of an input image data and a second gray level accumulation value of a plurality of negative polarity pixels of the input image data. The calculation module is coupled to the accumulation module. The calculation module is configured to calculate a normalized difference value of the first gray level accumulation value and the second gray level accumulation value, and adjust a first offset value and a second offset value according to a weight value corresponding to the normalized difference value to generate an adjusted first offset value and an adjusted second offset value. The compensation module is coupled to the calculation module. The compensation module is configured to compensate a plurality of target compensation pixels of the input image data according to the adjusted first offset value and the adjusted second offset value to generate an output image data. The plurality of target compensation pixels is determined by the first gray level accumulation value and second gray level accumulation value.

The image compensation method includes the following steps: accumulating a first gray level accumulation value of a plurality of positive polarity pixels of an input image data and a second gray level accumulation value of a plurality of negative polarity pixels of the input image data; calculating a normalized difference value of the first gray level accumulation value and the second gray level accumulation value; adjusting a first offset value and a second offset value according to a weight value corresponding to the normalized difference value to generate an adjusted first offset value and an adjusted second offset value; and compensating a plurality of target compensation pixels of the input image data according to the adjusted first offset value and the adjusted second offset value to generate an output image data. The plurality of target compensation pixels is determined by the first gray level accumulation value and second gray level accumulation value.

Based on the above description, the display driving device and the image compensation method may effectively mitigate the crosstalk caused by the positive and negative polarity reversal of pixels in the display panel when displaying a specific picture.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
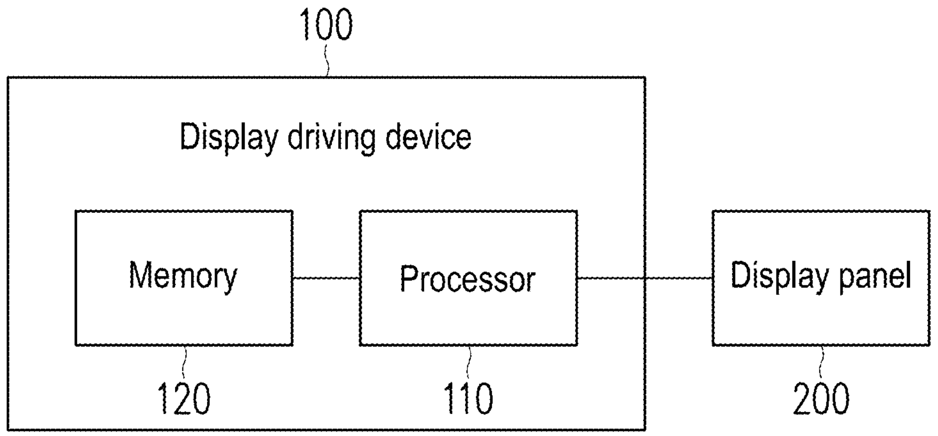
FIG. 1 is a schematic diagram of a display driving device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as “comprise” and “include” are open-ended terms, and should be explained as “including but not limited to . . . ”

The term “coupling (or electrically connection)” used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device.

FIG. 1 is a schematic diagram of a display driving device according to an embodiment of the disclosure. Referring to FIG. 1, the display driving device 100 includes a processor 110 and a memory 120. The processor 110 is coupled to the memory 120. In the embodiment of the disclosure, the display driving device 100 is a timing controller (TCON), and the processor 110 is further coupled to a display panel 200. The processor 110 may receive an input image data from an image source, and the processor 110 may modify the input image data to generate an output image data. The processor 110 may drive the display panel 200 according to the output image data.

In the embodiment of the disclosure, the processor 110 may be a field programmable gate array (FPGA), an application-specific integrated circuit (ASIC), or a micro-controller. The memory 120 may be a static random-access memory (SRAM), a dynamic random-access memory (DRAM), a synchronized dynamic random-access memory (SDRAM), or a flash memory. In the embodiment of the disclosure, the display panel 200 may be a liquid-crystal display (LCD), a light emitting diode (LED) display panel, or an organic light emitting diode (OLED) display panel.

In the embodiment of the disclosure, there may also be a source driver, a gate driver, or other related driver circuits between the display driving device 100 and the display panel 200. The processor 110 may provide the output image data to the source driver, the gate driver, or other related driver circuits to drive the display panel 200.

Figure 2:
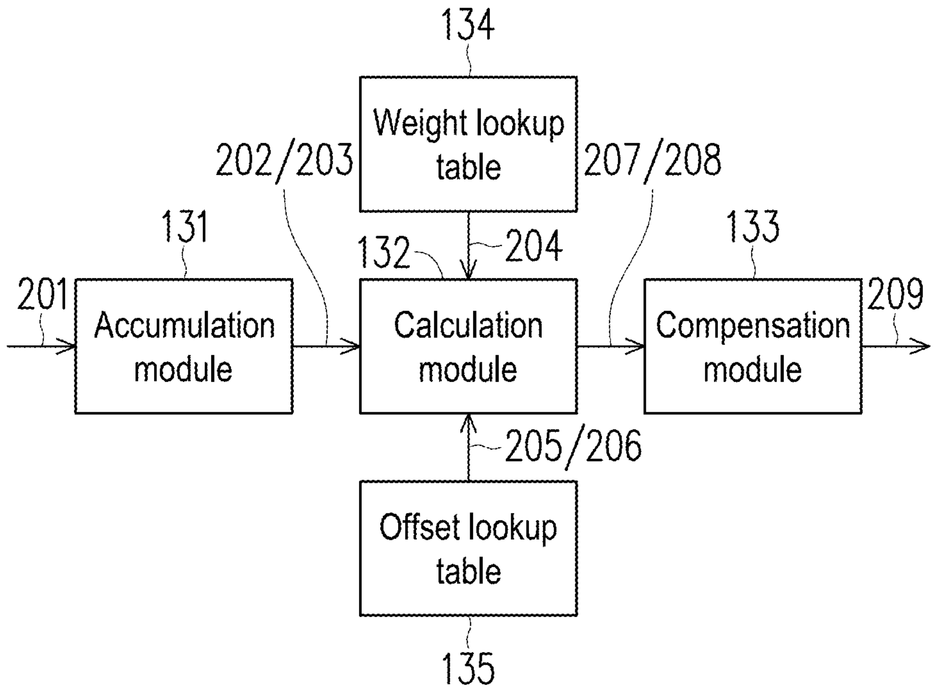
FIG. 2 is a schematic diagram of a plurality of modules according to an embodiment of the disclosure.

FIG. 2 is a schematic diagram of a plurality of modules according to an embodiment of the disclosure. Referring to FIG. 1 and FIG. 2, the memory 120 may store an accumulation module 131, a calculation module 132, a compensation module 133, a weight lookup table 134, and an offset lookup table 135 for reading and executing by the processor 110. In one embodiment of the disclosure, at least one of the accumulation module 131, the calculation module 132, and the compensation module 133 may also be implemented in the form of specific functional circuits.

Figure 3:
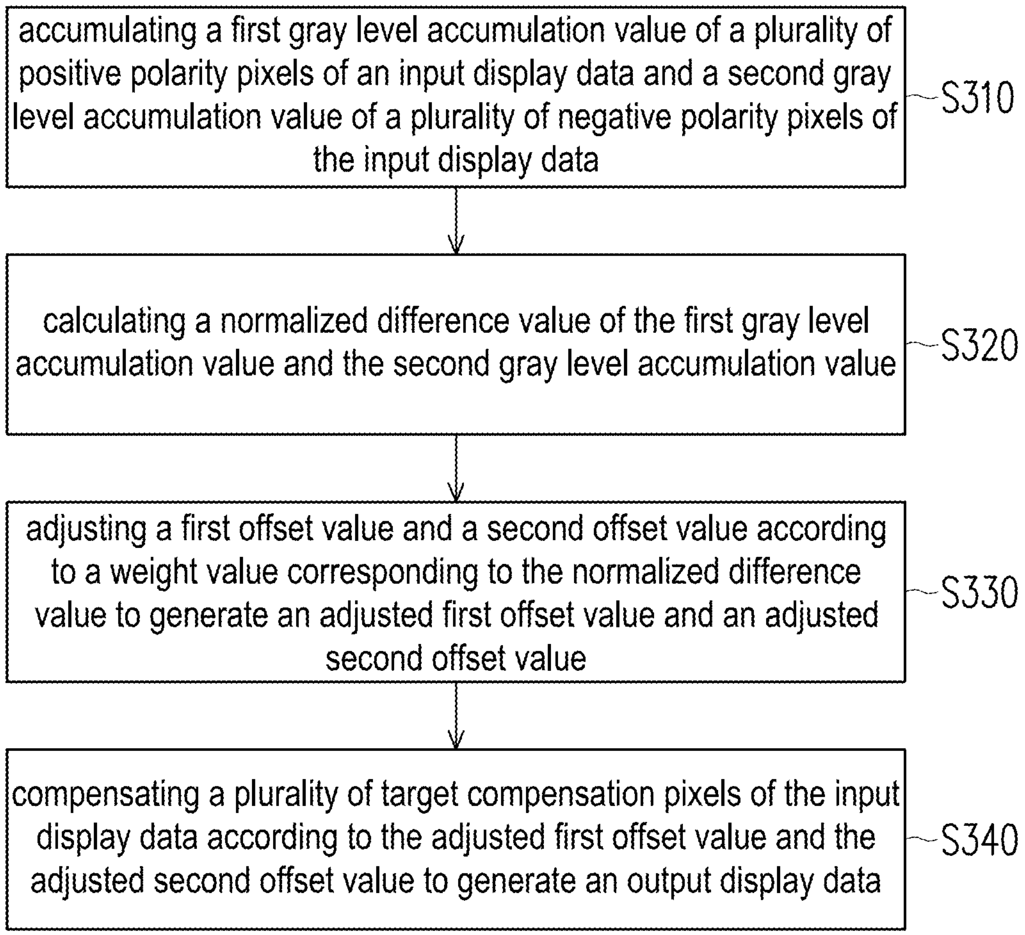
FIG. 3 is a flowchart of an image compensation method according to an embodiment of the disclosure.

FIG. 3 is a flowchart of an image compensation method according to an embodiment of the disclosure. Referring to FIG. 1 to FIG. 3, the display driving device 100 may perform the following steps S310 to S340. In the embodiment of the disclosure, the display driving device 100 may receive an input image data 201. In step S310, the accumulation module 131 accumulates a first gray level accumulation value 202 of a plurality of positive polarity pixels of an input display data 201 and a second gray level accumulation value 203 of a plurality of negative polarity pixels of the input display data 201. The accumulation module 131 provides the first gray level accumulation value 202 and the second gray level accumulation value 203 to the calculation module 132. In the step S320, the calculation module 132 calculates a normalized difference value of the first gray level accumulation value 202 and the second gray level accumulation value 203.

In the embodiment of the disclosure, the calculation module 132 may read a weight value 204 from the weight lookup table 134 according to the normalized difference value. Moreover, the calculation module 132 may read a first offset value 205 and a second offset value 206 from the offset lookup table 135 according to a predetermined low gray level and a predetermined high gray level. In the embodiment of the disclosure, the predetermined low gray level and the predetermined high gray level may be determined by at least part of the pixels of a pixel array of the display panel 200.

In the step S330, the calculation module 132 adjusts the first offset value 205 and the second offset value 206 according to the weight value 204 corresponding to the normalized difference value to generate an adjusted first offset value 207 and an adjusted second offset value 208. In step S340, the compensation module 133 compensates a plurality of target compensation pixels of the input display data 201 according to the adjusted first offset value 207 and the adjusted second offset value 208 to generate an output display data 209. In the embodiment of the disclosure, the plurality of target compensation pixels may be determined by the first gray level accumulation value and second gray level accumulation value.

In the embodiment of the disclosure, the calculation module 132 may subtract the first gray level accumulation value 202 from the second gray level accumulation value 203 to obtain a difference value, and divides an absolute value of the difference value by an accumulated pixel count to obtain the normalized difference value. Then, the calculation module 132 may multiply the first offset value by the weight value and divides a preset value to generate the adjusted first offset value, and multiply the second offset value by the weight value and divides the preset value to generate the adjusted second offset value.

In the embodiment of the disclosure, when the first gray level accumulation value is higher than the second gray level accumulation value, the compensation module 133 may determine at least part of the plurality of positive polarity pixels whose gray level is equal to the predetermined high gray level and at least part of the plurality of negative polarity pixels whose gray level is equal to the predetermined low gray level as the plurality of target compensation pixels. The compensation module 133 may subtract the gray level of each of the at least part of the plurality of positive polarity pixels to the adjusted first offset value to compensate the at least part of the plurality of positive polarity pixels, and the compensation module 133 may add the gray level of each of the at least part of the plurality of negative polarity pixels to the adjusted second offset value to compensate the at least part of the plurality of negative polarity pixels.

In the embodiment of the disclosure, when the first gray level accumulation value is lower than the second gray level accumulation value, the compensation module 133 may determine at least part of the plurality of positive polarity pixels whose gray level is equal to the predetermined high gray level and at least part of the plurality of negative polarity pixels whose gray level is equal to the predetermined low gray level as the plurality of target compensation pixels, but the disclosure is not limited thereto. In one embodiment of the disclosure, the compensation module 133 may also compensate the pixels with a plurality of different specific gray levels. In the embodiment of the disclosure, the compensation module 133 may add the gray level of each of the at least part of the plurality of positive polarity pixels to the adjusted second offset value to compensate the at least part of the plurality of positive polarity pixels, and the compensation module 133 may subtract the gray level of each of the at least part of the plurality of negative polarity pixels to the adjusted first offset value to compensate the at least part of the plurality of negative polarity pixels.

In one embodiment of the disclosure, when the first gray level accumulation value is equal to the second gray level accumulation value, the compensation module 133 may do not perform the compensation operation. In the embodiment of the disclosure, the processor 110 may drive the display panel 200 according to the output display data 209 with the compensated gray level of the above pixels. Therefore, the display driving device 100 and the image compensation method of the disclosure may effectively mitigate the cross-talk caused by the positive and negative polarity reversal of pixels in the display panel 200.

Figure 4:
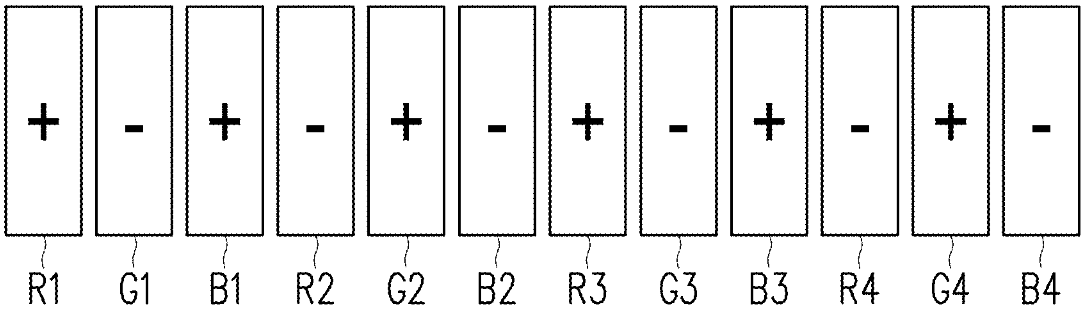
FIG. 4 is a schematic diagram of a plurality of pixels according to an embodiment of the disclosure.

FIG. 4 is a schematic diagram of a plurality of pixels according to an embodiment of the disclosure Referring to FIG. 1, FIG. 2, and FIG. 4, in the embodiment of the disclosure, the processor 110 may compensate for a plurality of pixels arranged on the same horizontal line in the pixel array of the display panel 200 (i.e. the pixels coupled to the same scan line or the pixels in the same row), but the disclosure is not limited thereto. In one embodiment of the disclosure, the above positive polarity pixels and the above negative polarity pixels may correspond to at least one horizontal line in the pixel array of the display panel 200. In another one embodiment of the disclosure, the above positive polarity pixels and the above negative polarity pixels may correspond to a part of region of the pixel array of the display panel 200. In the embodiment of the disclosure, the processor 110 may analyze the pixels (or sub-pixels) R1 to R4, G1 to G4, and B1 to B4 as shown in FIG. 4. The pixels R1, B1, G2, R3, B3, and G4 may be the positive polarity pixels, and the pixels G1, R2, B2, G3, R4, and B4 may be the negative polarity pixels. The pixels R1 to R4 may be red pixels. The pixels G1 to G4 may be green pixels. The pixels B1 to B4 may be blue pixels.

Figure 5:
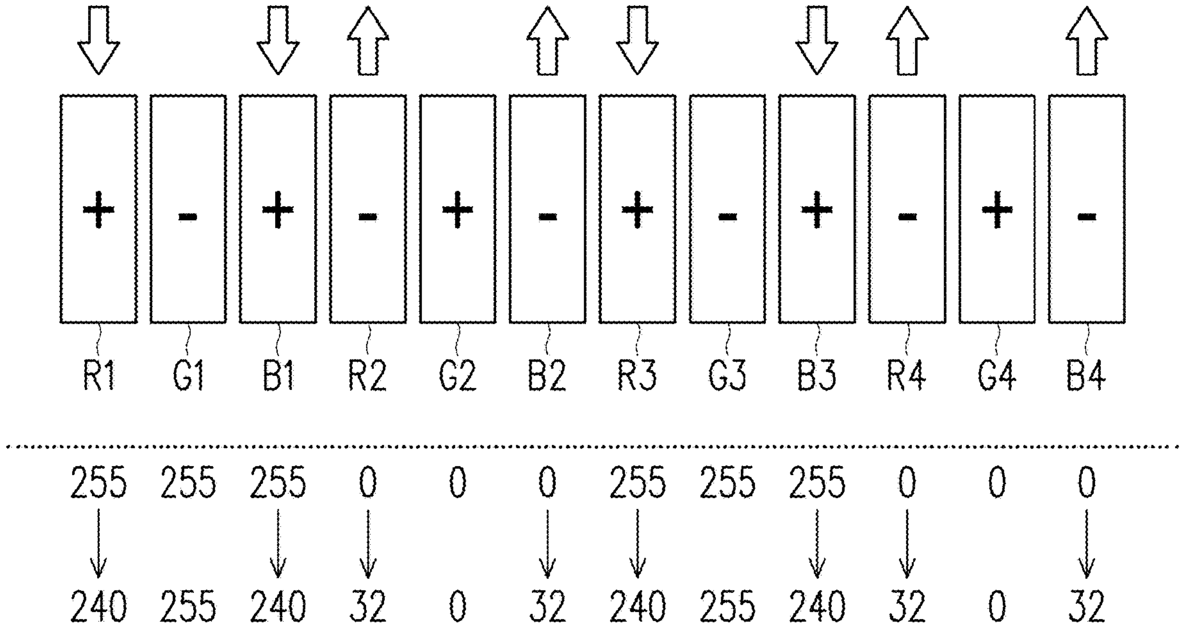
FIG. 5 is a schematic diagram of image compensation according to an embodiment of the disclosure.

FIG. 5 is a schematic diagram of image compensation according to an embodiment of the disclosure. Referring to FIG. 1, FIG. 2, and FIG. 5, for example, in one embodiment of the disclosure, the gray levels of the pixels R1, G1, B1, R3, G3, and B3 may be 255, and the gray levels of the pixels R2, G2, B2, R4, G4, and B4 may be 0. In the embodiment of the disclosure, the accumulation module 131 accumulates the first gray level accumulation value of the positive polarity pixels, and the first gray level accumulation value may equal to 1020 (=255×4). The accumulation module 131 accumulates the second gray level accumulation value of the negative polarity pixels, and the second gray level accumulation value may equal to 510 (=255×2).

In the embodiment of the disclosure, the calculation module 132 may subtract the first gray level accumulation value "1020" from the second gray level accumulation value "510" to obtain the difference value "510". Then, the calculation module 132 may divide an absolute value of the difference value "510" by an accumulated pixel count "12" to obtain the normalized difference value of approximately "43" (i.e. =510/12).

In the embodiment of the disclosure, the weight lookup table 134 may have the following data contents in table 1. The calculation module 132 may read the weight value of "86" from the weight lookup table 134 according to the normalized difference value "43". Specifically, the normalized difference value "43" is between "40" and "48", thus the calculation module 132 may calculate the weight value of "86" corresponding to the normalized difference value "43" through the interpolation of "80" and "96".

TABLE 1

| Normalized difference value | Weight value |
|---|---|
| 0 | 0 |
| 8 | 16 |
| . . . | . . . |
| 40 | 80 |
| 48 | 96 |
| . . . | . . . |
| 120 | 240 |
| 127 | 255 |

In the embodiment of the disclosure, the offset lookup table 135 may have the following data contents in table 2. For example, the predetermined low gray level may be "0", and the predetermined high gray level may be "255". Therefore, the calculation module 132 may read the first offset value "22" and the second offset value "48" from the offset lookup table 135.

TABLE 2

| Low gray level | Offset value | High gray level | Offset value |
|---|---|---|---|
| 0 | 22 | 0 | 0 |
| 16 | 21 | 16 | 3 |
| 240 | 1 | 240 | 45 |
| 255 | 0 | 255 | 48 |

In the embodiment of the disclosure, the calculation module 132 may multiply the first offset value "22" by the weight value "86" and divides, for example, a preset value "128" to generate the adjusted first offset value of approximately "15" (i.e. =22×86/128), and multiply the second offset value "48" by the weight value "86" and divides the preset value "128" to generate the adjusted second offset value of approximately "32" (i.e. =48×86/128).

Then, the compensation module 133 may determine that the first gray level accumulation value "1020" is higher than the second gray level accumulation value "510", the compensation module 133 may determine the pixels R1, B1, R3, and B3 with the positive polarity whose gray levels are equal to the predetermined high gray level "255" and pixels R2, B2, R4, and B4 with the negative polarity whose gray level are equal to the predetermined low gray level "0" as the plurality of target compensation pixels. The compensation module 133 may subtract the gray level "255" of the pixels R1, B1, R3, and B3 to the adjusted first offset value "15" to obtain the compensated gray level "240" of the pixels R1, B1, R3, and B3 (i.e. 255-15=240). The compensation module 133 may add the gray level "0" of the pixels R2, B2, R4, and B4 to the second offset value "32" to obtain the compensated gray level "32" of the pixels R2, B2, R4, and B4 (i.e. 0+32=32). Therefore, the gray level difference (i.e. data voltage difference) between the positive and negative polarities of some pixels can be appropriately reduced, thus the crosstalk problem in the display driving process may be effectively alleviated.

Figure 6:
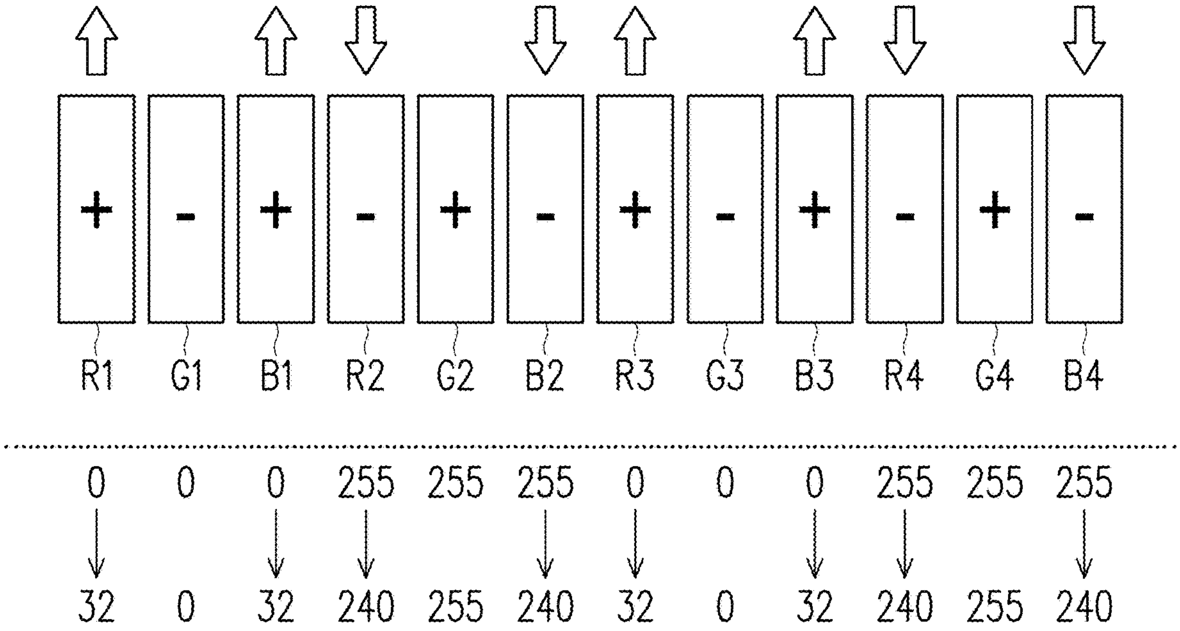
FIG. 6 is a schematic diagram of image compensation according to another embodiment of the disclosure.

FIG. 6 is a schematic diagram of image compensation according to another embodiment of the disclosure. Referring to FIG. 1, FIG. 2, and FIG. 6, for example, in another one embodiment of the disclosure, the gray levels of the pixels R1, G1, B1, R3, G3, and B3 may be 0, and the gray levels of the pixels R2, G2, B2, R4, G4, and B4 may be 255. In the embodiment of the disclosure, the accumulation module 131 accumulates the first gray level accumulation value of the positive polarity pixels, and the first gray level accumulation value may equal to 510 (=255×2). The accumulation module 131 accumulates the second gray level accumulation value of the negative polarity pixels, and the second gray level accumulation value may equal to 1020 (=255×4).

In the embodiment of the disclosure, the calculation module 132 may subtract the first gray level accumulation value "510" from the second gray level accumulation value "510" to obtain the difference value "1020". Then, the calculation module 132 may divide an absolute value of the difference value "510" by an accumulated pixel count "12" to obtain the normalized difference value of approximately "43" (i.e. =510/12).

In the embodiment of the disclosure, the calculation module 132 may read the weight value of "86" from the above table 1 according to the normalized difference value "43". Specifically, the normalized difference value "43" is between "40" and "48", thus the calculation module 132 may calculate the weight value of "86" corresponding to the normalized difference value "43" through the interpolation of "80" and "96".

In the embodiment of the disclosure, for example, the predetermined low gray level may be "0", and the predetermined high gray level may be "255". The calculation module 132 may read the first offset value "22" and the second offset value "48" from the above table 2.

In the embodiment of the disclosure, the calculation module 132 may multiply the first offset value "22" by the weight value "86" and divides, for example, a preset value "128" to generate the adjusted first offset value of approximately "15" (i.e. =22×86/128), and multiply the second offset value "48" by the weight value "86" and divides the preset value "128" to generate the adjusted second offset value of approximately "32" (i.e. =48×86/128).

Then, the compensation module 133 may determine that the first gray level accumulation value "510" is lower than the second gray level accumulation value "1020", the compensation module 133 may determine the pixels R1, B1, R3, and B3 with the positive polarity whose gray levels are equal to the predetermined low gray level "0" and pixels R2, B2, R4, and B4 with the negative polarity whose gray level are equal to the predetermined high gray level "255" as the plurality of target compensation pixels. The compensation module 133 may add the gray level "0" of the pixels R1, B1, R3, and B3 to the adjusted first offset value "32" to obtain the compensated gray level "32" of the pixels R1, B1, R3, and B3 (i.e. 0+32=32). The compensation module 133 may subtract the gray level "255" of the pixels R2, B2, R4, and B4 to the second offset value "15" to obtain the compensated gray level "240" of the pixels R2, B2, R4, and B4 (i.e. 255−15=240). Therefore, the gray level difference (i.e. data voltage difference) between the positive and negative polarities of some pixels can be appropriately reduced, thus the crosstalk problem in the display driving process may be effectively alleviated.

In summary, the display driving device and an image compensation method of the disclosure may automatically detect the gray level of each pixel in the image data and may automatically compensate for the gray level of some pixels. Therefore, the gray level difference (i.e. data voltage difference) between the positive and negative polarities of some pixels can be appropriately reduced, thus the crosstalk problem in the display driving process may be effectively alleviated.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display driving device, comprising:

an accumulation module, configured to accumulate a first gray level accumulation value of a plurality of positive polarity pixels of an input image data and a second gray level accumulation value of a plurality of negative polarity pixels of the input image data;

a calculation module, coupled to the accumulation module, and configured to calculate a normalized difference value of the first gray level accumulation value and the second gray level accumulation value, and adjust a first offset value and a second offset value according to a weight value corresponding to the normalized difference value to generate an adjusted first offset value and an adjusted second offset value; and a compensation module, coupled to the calculation module, and configured to compensate a plurality of target compensation pixels of the input image data according to the adjusted first offset value and the adjusted second offset value to generate an output image data, wherein the plurality of target compensation pixels is determined by the first gray level accumulation value and second gray level accumulation value.

2. The display driving device according to claim 1, wherein the plurality of positive polarity pixels and the plurality of negative polarity pixels correspond to at least one horizontal line in a pixel array of a display panel.

3. The display driving device according to claim 2, wherein the calculation module subtracts the first gray level accumulation value from the second gray level accumulation value to obtain a difference value, and divides an absolute value of the difference value by an accumulated pixel count to obtain the normalized difference value.

4. The display driving device according to claim 1, wherein the calculation module reads the weight value from a weight lookup table according to the normalized difference value.

5. The display driving device according to claim 1, wherein the calculation module multiplies the first offset value by the weight value and divides a preset value to generate the adjusted first offset value, and the calculation module multiplies the second offset value by the weight value and divides the preset value to generate the adjusted second offset value.

6. The display driving device according to claim 1, wherein the calculation module reads the first offset value and the second offset value from an offset lookup table according to a predetermined low gray level and a predetermined high gray level.

7. The display driving device according to claim 6, wherein when the first gray level accumulation value is higher than the second gray level accumulation value, the compensation module determines at least part of the plurality of positive polarity pixels whose gray level is equal to the predetermined high gray level and at least part of the plurality of negative polarity pixels whose gray level is equal to the predetermined low gray level as the plurality of target compensation pixels.

8. The display driving device according to claim 7, wherein the compensation module subtracts the gray level of each of the at least part of the plurality of positive polarity pixels to the adjusted first offset value to compensate the at least part of the plurality of positive polarity pixels, and the compensation module adds the gray level of each of the at least part of the plurality of negative polarity pixels to the adjusted second offset value to compensate the at least part of the plurality of negative polarity pixels.

9. The display driving device according to claim 6, wherein when the first gray level accumulation value is lower than the second gray level accumulation value, the compensation module determines at least part of the plurality of positive polarity pixels whose gray level is equal to the predetermined high gray level and at least part of the plurality of negative polarity pixels whose gray level is equal to the predetermined low gray level as the plurality of target compensation pixels.

10. The display driving device according to claim 9, wherein the compensation module adds the gray level of each of the at least part of the plurality of positive polarity pixels to the adjusted second offset value to compensate the at least part of the plurality of positive polarity pixels, and the compensation module subtracts the gray level of each of the at least part of the plurality of negative polarity pixels to the adjusted first offset value to compensate the at least part of the plurality of negative polarity pixels.

11. An image compensation method, comprises:

accumulating a first gray level accumulation value of a plurality of positive polarity pixels of an input image data and a second gray level accumulation value of a plurality of negative polarity pixels of the input image data;

calculating a normalized difference value of the first gray level accumulation value and the second gray level accumulation value;

adjusting a first offset value and a second offset value according to a weight value corresponding to the normalized difference value to generate an adjusted first offset value and an adjusted second offset value; and compensating a plurality of target compensation pixels of the input image data according to the adjusted first offset value and the adjusted second offset value to generate an output image data, wherein the plurality of target compensation pixels is determined by the first gray level accumulation value and second gray level accumulation value.

12. The image compensation method according to claim 11, wherein the plurality of positive polarity pixels and the plurality of negative polarity pixels correspond to at least one horizontal line in a pixel array of a display panel.

13. The image compensation method according to claim 12, wherein the step of calculating the normalized difference value comprises:

subtracting the first gray level accumulation value from the second gray level accumulation value to obtain a difference value; and dividing an absolute value of the difference value by an accumulated pixel count to obtain the normalized difference value.

14. The image compensation method according to claim 13, further comprising:

reading the weight value from a weight lookup table according to the normalized difference value.

15. The image compensation method according to claim 13, wherein the step of generating the adjusted first offset value and the adjusted second offset value comprises:

multiplying the first offset value by the weight value and divides a preset value to generate the adjusted first offset value; and multiplying the second offset value by the weight value and divides the preset value to generate the adjusted second offset value.

16. The image compensation method according to claim 13, further comprising:

reading the first offset value and the second offset value from an offset lookup table according to a predetermined low gray level and a predetermined high gray level.

17. The image compensation method according to claim 16, further comprising:

when the first gray level accumulation value is higher than the second gray level accumulation value, determining at least part of the plurality of positive polarity pixels whose gray level is equal to the predetermined high gray level and at least part of the plurality of negative polarity pixels whose gray level is equal to the predetermined low gray level as the plurality of target compensation pixels.

18. The image compensation method according to claim 17, wherein the step of compensating the plurality of target compensation pixels comprises:

subtracting the gray level of each of the at least part of the plurality of positive polarity pixels to the adjusted first offset value to compensate the at least part of the plurality of positive polarity pixels; and adding the gray level of each of the at least part of the plurality of negative polarity pixels to the adjusted second offset value to compensate the at least part of the plurality of negative polarity pixels.

19. The image compensation method according to claim 16, further comprising:

when the first gray level accumulation value is lower than the second gray level accumulation value, determining at least part of the plurality of positive polarity pixels whose gray level is equal to the predetermined high gray level and at least part of the plurality of negative polarity pixels whose gray level is equal to the predetermined low gray level as the plurality of target compensation pixels.

20. The image compensation method according to claim 17, wherein the step of compensating the plurality of target compensation pixels comprises:

adding the gray level of each of the at least part of the plurality of positive polarity pixels to the adjusted second offset value to compensate the at least part of the plurality of positive polarity pixels; and subtracting the gray level of each of the at least part of the plurality of negative polarity pixels to the adjusted first offset value to compensate the at least part of the plurality of negative polarity pixels.

* * * * *